US011441915B2

(12) United States Patent
Jackson et al.

(10) Patent No.: US 11,441,915 B2
(45) Date of Patent: Sep. 13, 2022

(54) CIRCUITS FOR ELECTRICITY-GENERATING UNITS

(71) Applicant: M. A. Mortenson Company, North Minneapolis, MN (US)

(72) Inventors: Jeffrey Paul Jackson, Edina, MN (US); Raafe Karim Khan, Mumbai (IN); Joseph Robert Bethke, Woodbury, MN (US)

(73) Assignee: M. A. Mortenson Company, North Minneapolis, MN (US)

( * ) Notice: Subject to any disclaimer, the term of this patent is extended or adjusted under 35 U.S.C. 154(b) by 681 days.

(21) Appl. No.: 16/445,144

(22) Filed: Jun. 18, 2019

(65) Prior Publication Data

US 2020/0400449 A1     Dec. 24, 2020

(51) Int. Cl.
| | |
|---|---|
| *G01C 21/34* | (2006.01) |
| *G06Q 10/04* | (2012.01) |
| *G06Q 10/08* | (2012.01) |
| *F03D 13/00* | (2016.01) |
| *F03D 9/00* | (2016.01) |
| *G06F 30/18* | (2020.01) |
| *H02J 3/00* | (2006.01) |

(52) U.S. Cl.
CPC .......... *G01C 21/3446* (2013.01); *F03D 9/00* (2013.01); *F03D 13/00* (2016.05); *G06F 30/18* (2020.01); *G06Q 10/04* (2013.01); *G06Q 10/08* (2013.01); *H02J 3/0075* (2020.01)

(58) Field of Classification Search
CPC ....... G01C 21/3446; F03D 13/00; F03D 9/00; G06F 30/18; H02J 3/0075; G06Q 10/04; G06Q 10/08

USPC .......................................................... 307/42
See application file for complete search history.

(56) References Cited

U.S. PATENT DOCUMENTS

| | | | |
|---|---|---|---|
| 6,021,372 A | 2/2000 | Harrington | |
| 6,477,515 B1 | 11/2002 | Boroujerdi et al. | |
| 8,108,138 B2 | 1/2012 | Bruce et al. | |
| 8,407,157 B2 | 3/2013 | Anderson | |
| 8,423,283 B2 | 4/2013 | Cerecke et al. | |
| 8,706,409 B2 | 4/2014 | Mason et al. | |
| 8,886,453 B2 | 11/2014 | Cerecke et al. | |
| 9,110,464 B2 | 8/2015 | Holland et al. | |
| 10,724,870 B2 * | 7/2020 | Adam .............. | G08G 1/096883 |

(Continued)

FOREIGN PATENT DOCUMENTS

| | | |
|---|---|---|
| CN | 103106300 A | 5/2013 |
| CN | 103366223 A | 10/2013 |

(Continued)

*Primary Examiner* — Hal Kaplan
(74) *Attorney, Agent, or Firm* — Schwegman Lundberg & Woessner, P.A.

(57) ABSTRACT

A system receives locations of a plurality of electricity-generating units in an area, and it divides the area into a plurality of sectors. The system traverses through the sectors and forms a set of sectors. The set of sectors includes a set of electricity-generating units. The set of electricity-generating units does not exceed an aggregate voltage threshold. The system forms a circuit with the set of electricity-generating units by determining a shortest path to connect the set of electricity-generating units. The system adjusts this shortest path to incorporate environmental and physical constraints.

25 Claims, 11 Drawing Sheets

(56) References Cited

U.S. PATENT DOCUMENTS

| | | | |
|---|---|---|---|
| 2003/0223373 | A1 | 12/2003 | Nakamura et al. |
| 2007/0106465 | A1 | 5/2007 | Adam et al. |

FOREIGN PATENT DOCUMENTS

| | | | |
|---|---|---|---|
| CN | 103996089 | A | 8/2014 |
| CN | 104599069 | A | 5/2015 |
| CN | 105404941 | A | 3/2016 |
| CN | 105656076 | A | 6/2016 |
| CN | 106407566 | A | 2/2017 |
| CN | 107909222 | A | 4/2018 |
| WO | WO-2018010471 | A1 | 1/2018 |

* cited by examiner

US 11,441,915 B2

CIRCUITS FOR ELECTRICITY-GENERATING UNITS

TECHNICAL FIELD

The present disclosure relates to the design and construction of least-cost linear infrastructure networks, and in a particular embodiment, but not by way of limitation, the design and construction of circuits for electricity-generating units, and more particularly, the design and construction of circuits for windmill farms.

BACKGROUND

Balance of plant (BOP) designs for wind energy plants include the road network to access wind turbines or other electricity-generating units, the crane path to move crawler cranes from one turbine to the next during the construction phase, the underground electrical collection system that connects all turbines to a central substation, and the overhead transmission lines that carry the electricity generated by the electricity-generating units from the central substation to the existing grid infrastructure.

DETAILED DESCRIPTION

Figure 1:
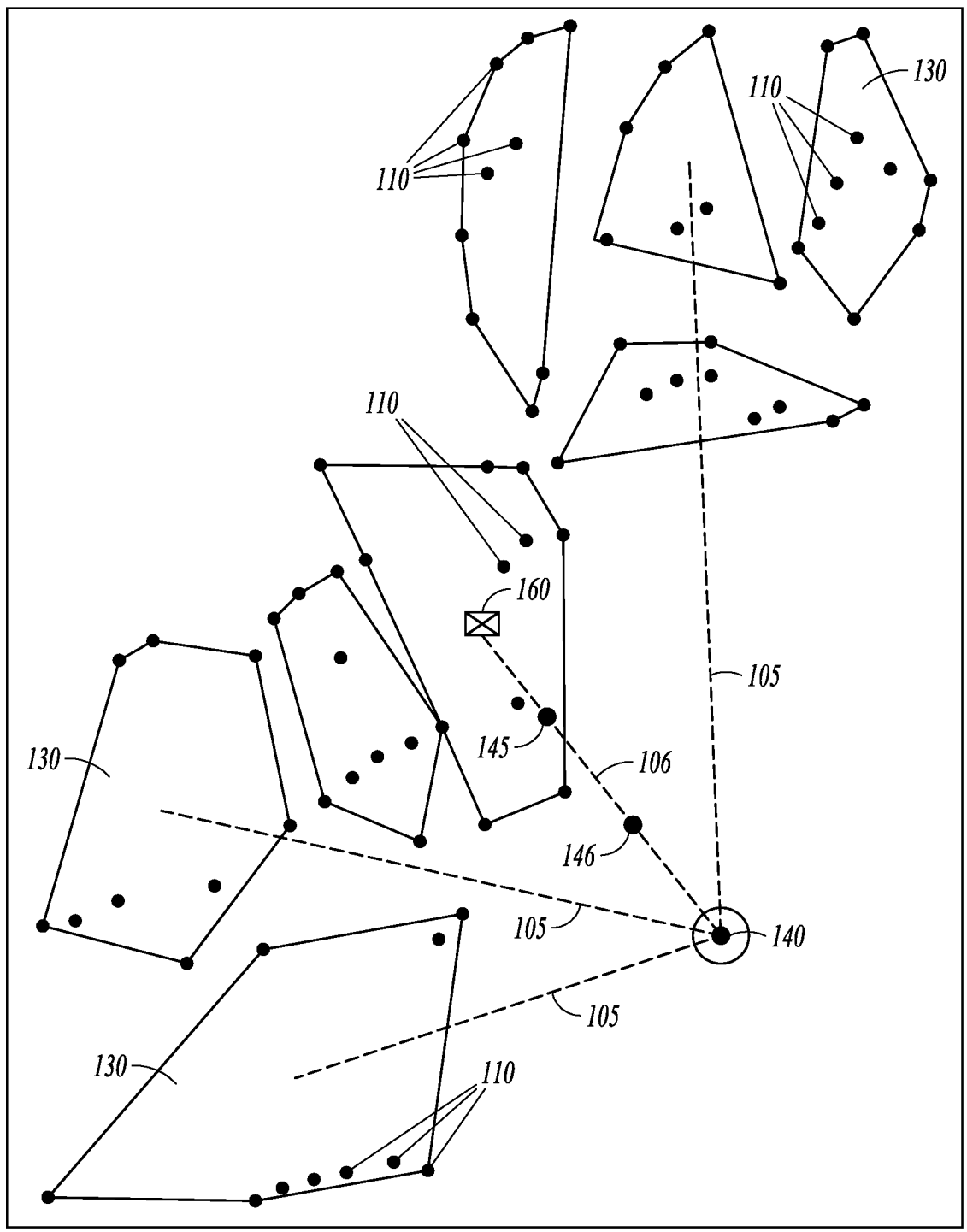
FIG. 1 is a diagram of an area including electricity-generating turbines and a sub station.

In the following description, for purposes of explanation, numerous specific details are set forth in order to provide a thorough understanding of the various aspects of different embodiments of the present invention. It will be evident, however, to one skilled in the art that the present invention may be practiced without all of the specific details and/or with variations, permutations, and combinations of the various features and elements described herein.

One or more embodiments disclosed herein implement wind farm electrical collection system design and construction through the use of graph theory principles, geographic information systems, and cost optimization. Most balance of plant (BOP) designs for wind energy facilities start with a fixed layout of turbine locations. As is known in the art, these locations are normally selected for optimal energy production. The plant designs also typically include project boundaries which delineate the areas for the turbines, existing public road infrastructure, and many more physical and environmental constraints (e.g. houses and agricultural buildings, wetlands, topographical features, etc.)

An embodiment is a computer-based system that designs least-cost linear infrastructure networks in an automated manner. The system utilizes multiple algorithms from the field of graph theory, for example, minimum spanning tree algorithms and variations of minimum spanning tree algorithms. It also incorporates costs for each unit, costs for each unit of measure of the linear infrastructure, and costs for considering and/or avoiding obstacles that may be encountered.

The system and the associated algorithms and processes can be used to design any network where lines (edges, in graph theory) are required to join with points (nodes, in graph theory), where the edges have a cost component per unit of measure and may also encounter obstacles that increase cost. Although the system is primarily directed to supporting renewable energy and electrical design layouts, there are other applications for the system, including engineering and construction (for example, road network layout design, design layouts for underground and overhead utilities, heavy equipment routing, electrical design, and mechanical (plumbing) design) and logistics (delivery optimization and road upgrade cost minimization).

An embodiment includes two primary scopes—underground electric lines that gather energy from the turbines (collection lines) and deliver the energy to a substation and overhead lines that carry the energy generated from the substation to the electric grid. The unit cost of each of these items is considered (for example, the cost per linear foot ($/lf) of electrical cables). The system also incorporates the cost of certain obstructions or features, such as the cost to circumvent a wetland or other body of water. The system generates multiple iterations of designs and calculates the total cost based on the length of the infrastructure and the cost-adders that the design incorporates (such as avoiding obstacles) and selects the design with the lowest overall system cost in view of the two primary scopes—collection lines and overhead lines for connection to the grid.

In another embodiment, a system has several primary scopes, including a first primary scope of generating multiple road networks for accessing electricity-generating units in an area, and determining a cost associated with each of the multiple road networks as a function of a cost for constructing new roads, a cost for upgrading existing roads, and a cost for avoiding obstacles. A second primary scope includes generating multiple crane path networks for moving cranes among the electricity-generating units in the area during a construction phase, and determining a cost associated with each of the multiple crane path networks as a function of a cost for constructing new roads for the crane path networks, a cost for upgrading existing roads for the new crane path networks, a cost for avoiding obstacles, and a cost for crane breakdowns. A third primary scope includes generating multiple electrical collection systems that connect the electricity-generating units to a substation, and determining a cost associated with each of the multiple electrical collection systems as a function of a cost of cables in each of the multiple electrical collection systems and a cost for avoiding obstacles. A fourth primary scope includes generating multiple overhead transmission line systems that carry the electricity generated by the electricity-generating units from the substation to an existing grid infrastructure, and determining a cost associated with each of the multiple overhead transmission lines systems as a function of the cost of cables, a location of the substation, and a location of a point of connection to the electric grid. A fifth primary scope includes the system selecting a particular road network as a function of the cost associated with the particular road network, selecting a particular crane path network as a function of the cost associated with the particular crane path network, selecting a particular electrical collection system as a function of the cost associated with the particular electrical collection system, and selecting a particular overhead transmission line system as a function of the cost associated with the particular overhead transmission line system.

An embodiment automates the design and cost estimation process primarily for wind powered projects. To get a minimum viable wind project layout, the system requires project boundary, public road, and turbine layout data. Every project has constraints that limit the design in one or more ways, for example, constraints like wetlands, dwellings, and many others. It can be important to stay away from these features as they impose an inherent risk to the construction of the project. The distance which acts as a buffer from a specific feature is known as a setback distance. Other optional data that may be used include substation location, point of interconnect between turbines, point of interconnect to the electric grid, and project parcels, and land use. Land use data relate to, for example, whether the wind project land includes pasture land or farm land, and how such different types of land affect the access roads and overhead transmission lines (such as farm lands requiring orthogonal infrastructure).

In the design of a windfarm, there are further considerations such as crossable and un-crossable constraints or features that may affect overall design of a project. Crossing a feature, for example boring an electrical collection line beneath a wetland, may involve an additional cost. Since an embodiment seeks to find the true lowest cost to connect turbines in circuits and then connect these circuits to a substation in a windfarm, it can be important to provide to the system the additional costs involved in crossing a feature versus going around the feature.

In determining the collection circuitry, the system can consider the feeder capacity (MW) and nameplate capacity for each turbine, as defined by the user. The number of circuits is defined due to the interaction of these elements. For example, if each turbine is rated at 2.5 MW and the feeder cannot exceed 30 MW, then the project should have at the minimum 12 circuits (that is, feeder capacity divided by the nameplate capacity (30/2.5)). The system can, if so desired by a user, prohibit home runs (that is, the lines close to the substation) from crossing each other. Additionally, the system can consider whether cable crossing should be avoided, and a cost for boring if cables do cross, and this will be explicitly called out in a cable management plan. A user can further enter whether a particular clustering method should be used, the number of clusters, whether previously created clusters should be used, and the maximum number of clusters that should be in a particular project area.

The collection determination can also consider different cable properties. The system can consider cable cost, which will affect cable choice and total cost of the system. The system can consider the maximum MWs each individual cable type can carry, which will affect cable choice and quantities of cables. Lastly, the system can consider loss inputs, such as the total power factor of the project and the operating voltage at which the grid operates.

The first step in the electrical collection system design process is to establish the location of the substation. The substation is the central gathering point of multiple underground collection lines where the electricity is gathered from all turbines and transformed to the voltage of the existing grid infrastructure. From the project substation, the wind project is often connected to the existing grid infrastructure via an overhead transmission line that connects to the grid via a "point of interconnect" (POI).

The substation location can be determined in a few different ways. In a first manner, the substation location is selected to be adjacent to a particular point on the existing grid infrastructure at which the project is required to connect. An example of this embodiment uses a k clustering algorithm, and is discussed in more detail below. In a second manner, the substation is centrally located among all the turbines. In a third manner, the substation location is selected based on land development criteria (e.g. when location is limited due to landowner or land lease requirements).

An embodiment evaluates the optimal location of the substation based on the cost of the underground electrical collection system and the cost of the overhead transmission lines that leave the substation to connect to the existing grid infrastructure. A reason that this is important is that the cost of the overhead transmission line is normally the responsibility of the owner of the windfarm, and there is a cost trade-off between the electrical collection system and the overhead transmission lines.

The process starts by grouping project turbines into clusters using a k means clustering algorithm. The goal of the k means clustering algorithm is to find the tightest set of clusters that groups all project turbines into polygons. An example of a result of a k means clustering algorithm on a turbine project area is illustrated in FIG. 1. FIG. 1 illustrates polygons 130, and the turbines 110 which make up the vertices of the polygons and all those turbines within each of the polygons. The process then finds the center point of each polygon created by the turbine groupings, and lines 105 are drawn from those polygon center points in a first iteration to the point of interconnect (POI) 140, then in a second iteration to the geographically weighted center of all the turbines 160, and then in several subsequent iterations to various points along a line 106 drawn between the point of interconnect 140 and the geographically weighted center 160 (e.g., 145 and 146). By applying a unit cost ($/foot) to these iterations of lines from the center point of each polygon to the point of interconnect 140, the geographically weighted center 160, and points along the line 106 connecting the point of interconnect 140 and the geographically weighted center 160, the algorithm can then iterate among bringing all polygon center points to the POI 140, the geographically weighted center 160, and points between the POI 140 and the geographically weighted center 160, and find the optimal location for the project substation based on the overall system cost of underground collection (cable and digging), versus the unit cost ($/foot) of the overhead line (cable and towers), with the lines from polygon center points to the POI 140, the geographically weighted center 160, and the points between the POI 140 and the geographically weighted center 160 acting as a proxy for the eventual electrical collection system design. The result is that all turbines connect via underground collection at the project substation and then are connected to the POI via an overhead transmission line. The project substation can be located at the geographic center of the turbines, adjacent to the POI, or at some location on a line between the two.

Turning now to the determination of how to connect the turbines in a cluster, and then connect the clusters to the substation, within a windfarm area, it can be important to have an efficient electrical collection system design. The installed cost of these systems is typically in the millions of dollars, so even marginal reductions in the quantity of collection lines installed can be meaningful from a cost savings perspective. A typical electrical collection system design in the United States is governed by the following key constraints. First, the number of turbines allowed on each electrical circuit, as determined by the capacity of each individual circuit and the capacity of the individual turbines. Second, any physical or environmental constraints that are in the area.

Additionally, each circuit is made up of multiple sizes of cable or wire, which increase in size as the wires approach the project substation to support a higher volume of electricity as the circuit gains additional turbines. Because there are typically multiple circuits on each wind project, the first step in the process of designing the electrical collection system is determining the most efficient groupings of turbines that make up a circuit. Within these groupings of turbines, which are the eventual circuits, additional considerations are incorporated into the algorithm, namely, a desire to reduce the larger cable sizes nearer to the project substation, and to avoid the number of times these circuits cross each other. An embodiment is therefore in contrast to an approach of using basic, simple minimum spanning tree algorithms to reduce overall quantities. There are at least two problems with the prior art approach of executing simple, basic minimum spanning tree algorithms. First, the use of minimum spanning tree algorithms can lead to crossings of electrical circuits. This is particularly the case in the immediate vicinity of the substation. Second, a basic minimum spanning tree approach leads to minimizing overall system quantities, but at the expense of actually increasing the largest cable sizes which carry the highest costs.

Figure 2:
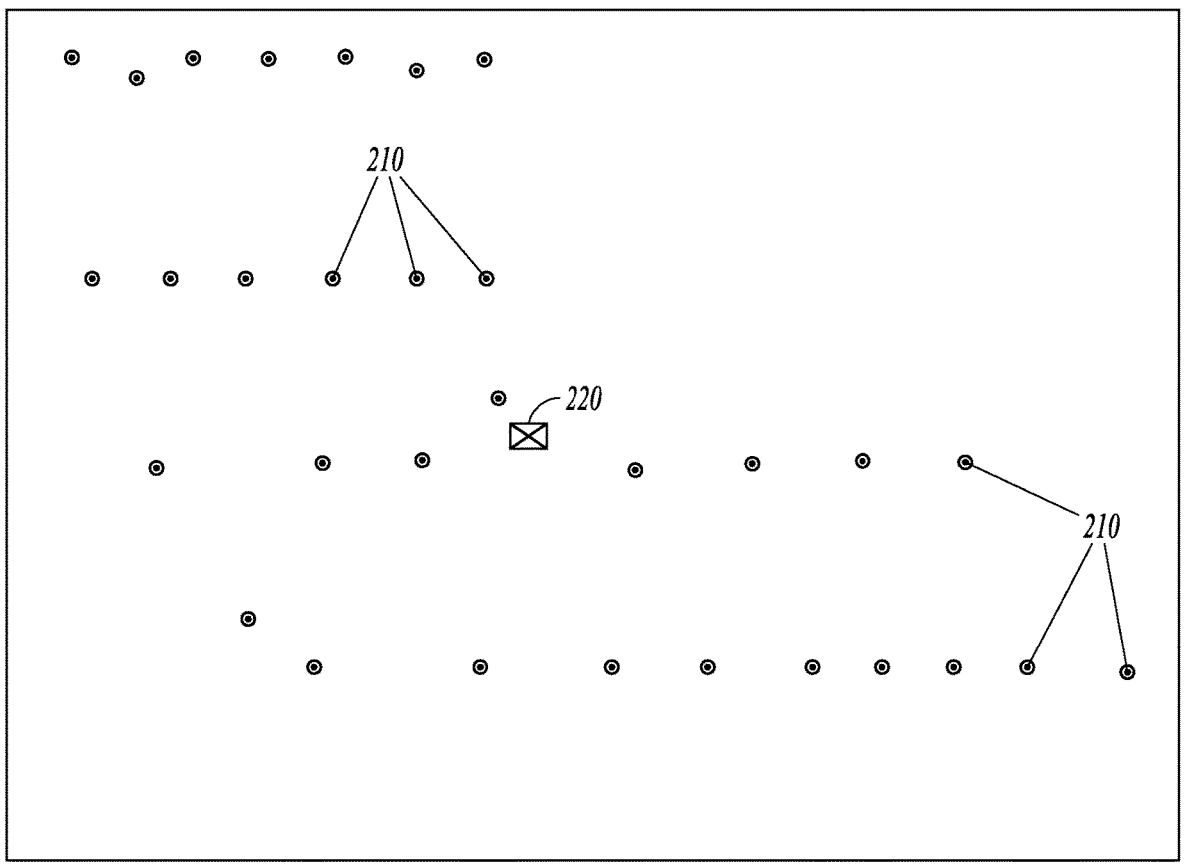
FIG. 2 is a diagram of electricity-generating turbines in a project area.

Therefore, in an embodiment, a novel, sectored, minimum spanning tree approach leverages all the benefits of utilizing a minimum spanning tree algorithm to reduce overall quantities of electrical collection system cables, while also separating the turbines into logical circuits and guiding the algorithm to avoid cable crossings and reduce larger cable sizing closer to the projects substation. This novel, sectored approach is illustrated beginning in FIG. 2, which illustrates a project area that includes turbines 210 and a substation 220.

Figure 3:
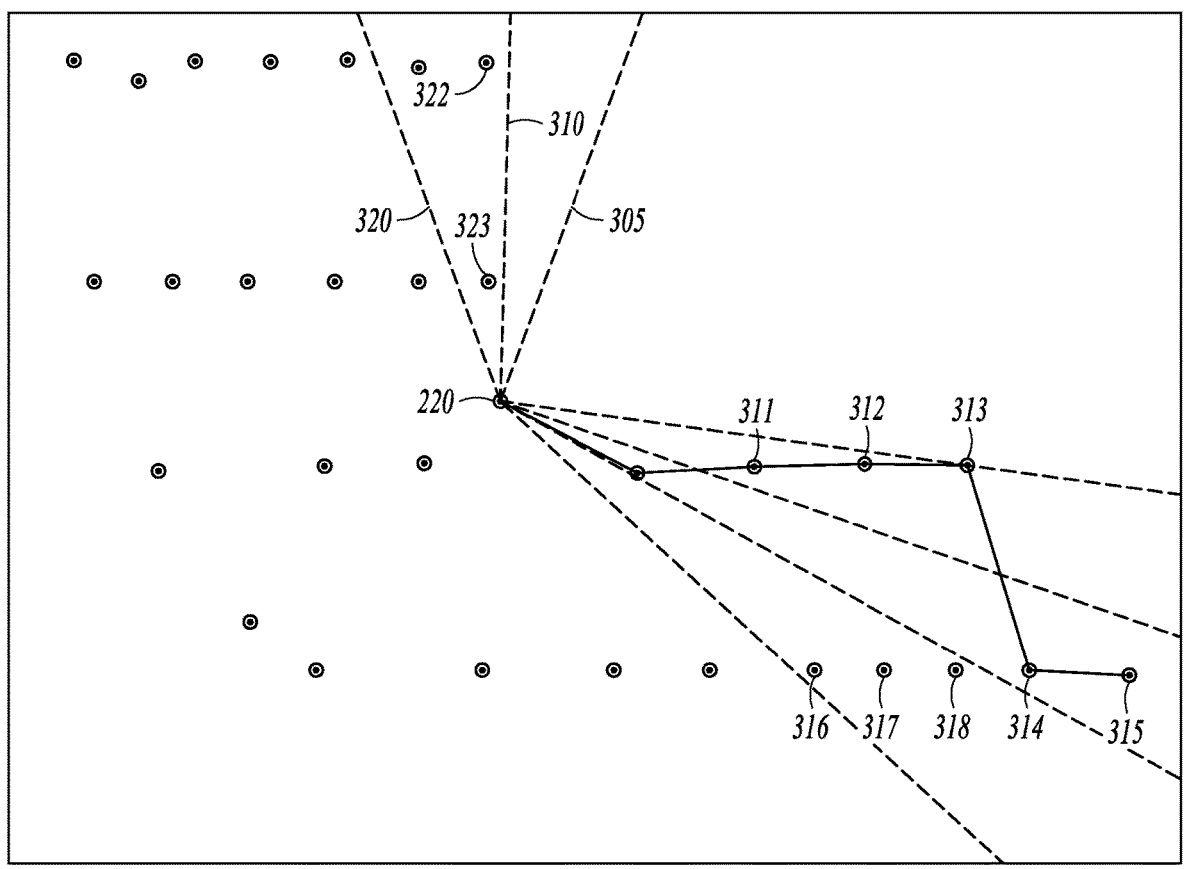
FIG. 3 is a diagram of the sectoring of the project area of FIG. 2.

Referring now to FIG. 3, the process starts by creating a sector with a 1° arc 305 at the 0° position 310, and progresses around the circle until it reaches the first turbine and starts to form a cluster. Each turbine in this sector is added to the first cluster. The sector then grows by an additional degree, adding additional turbines each time the sector grows by an incremental degree to include another turbine. When enough turbines have been added to the sector such that the total number of megawatts is maximized within the maximum capacity of the circuit, the cluster is finalized, and a new cluster begins from the last cluster's final angle. This process continues until all turbines have been clustered into what will eventually become circuits.

More specifically, and referring once again to FIG. 3, the process moves in a clockwise fashion to "select" and "accumulate" turbines as the process goes until it reaches the maximum capacity allowable for the circuit (as determined by the utility or other user). Beginning at the 0 degree line 310, one degree sectors are considered one sector at a time until a first turbine is encountered. In FIG. 3, that first turbine is 313. The encountering of the first turbine signals the beginning of the first sector. Thereafter, in this clockwise fashion, further one-degree sectors are added until the capacity of the turbines in the growing sector approaches the maximum megawatt capacity permitted in a collection circuit. In the example of FIG. 3, the units are collected in roughly the following order—313, 312, 311, 315, 314, 318, 317, and 316. Then, assuming for the purposes of illustration that an aggregation of units 311-318 approaches but does not exceed the maximum capacity allowed, the process groups the turbines 311-318 as a circuit, as is illustrated in FIG. 3.

Figure 4:
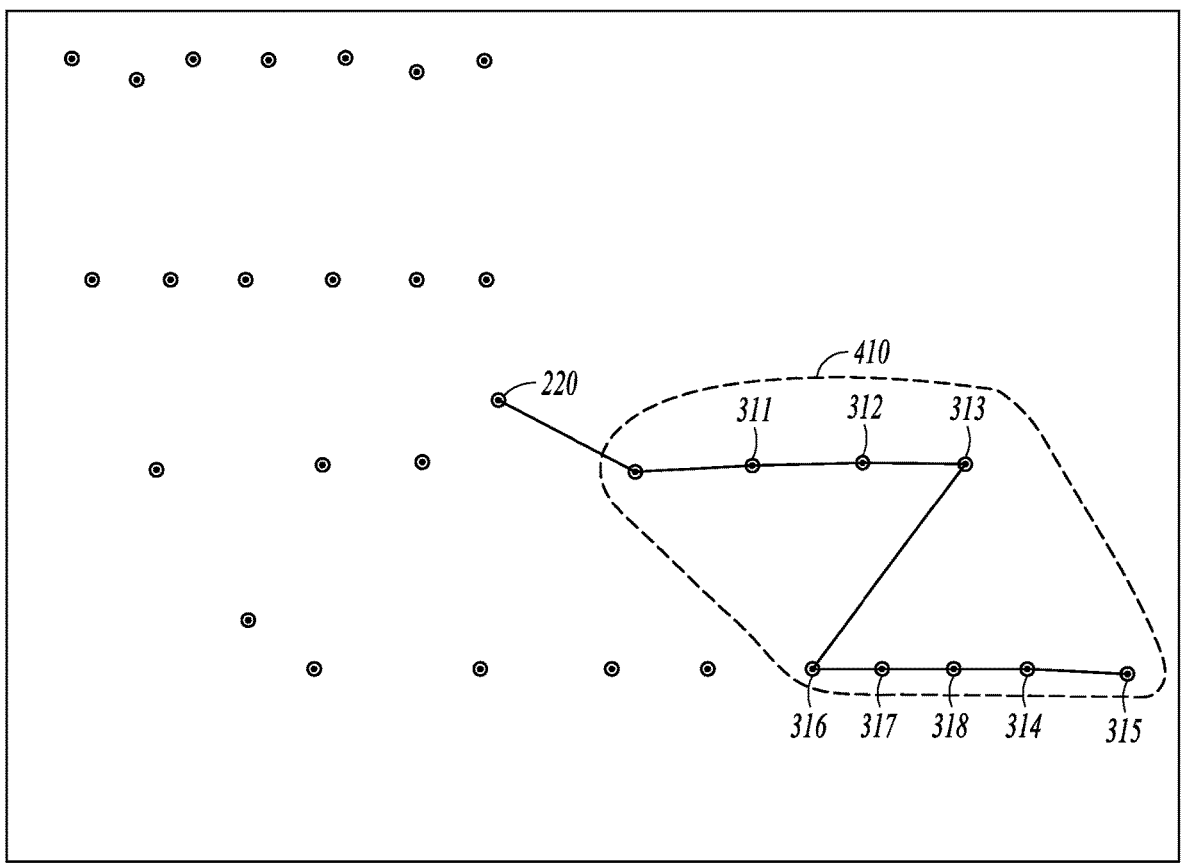
FIG. 4 is a diagram of a circuit connecting the electricity-generating turbines of FIG. 3.
Figure 5A:
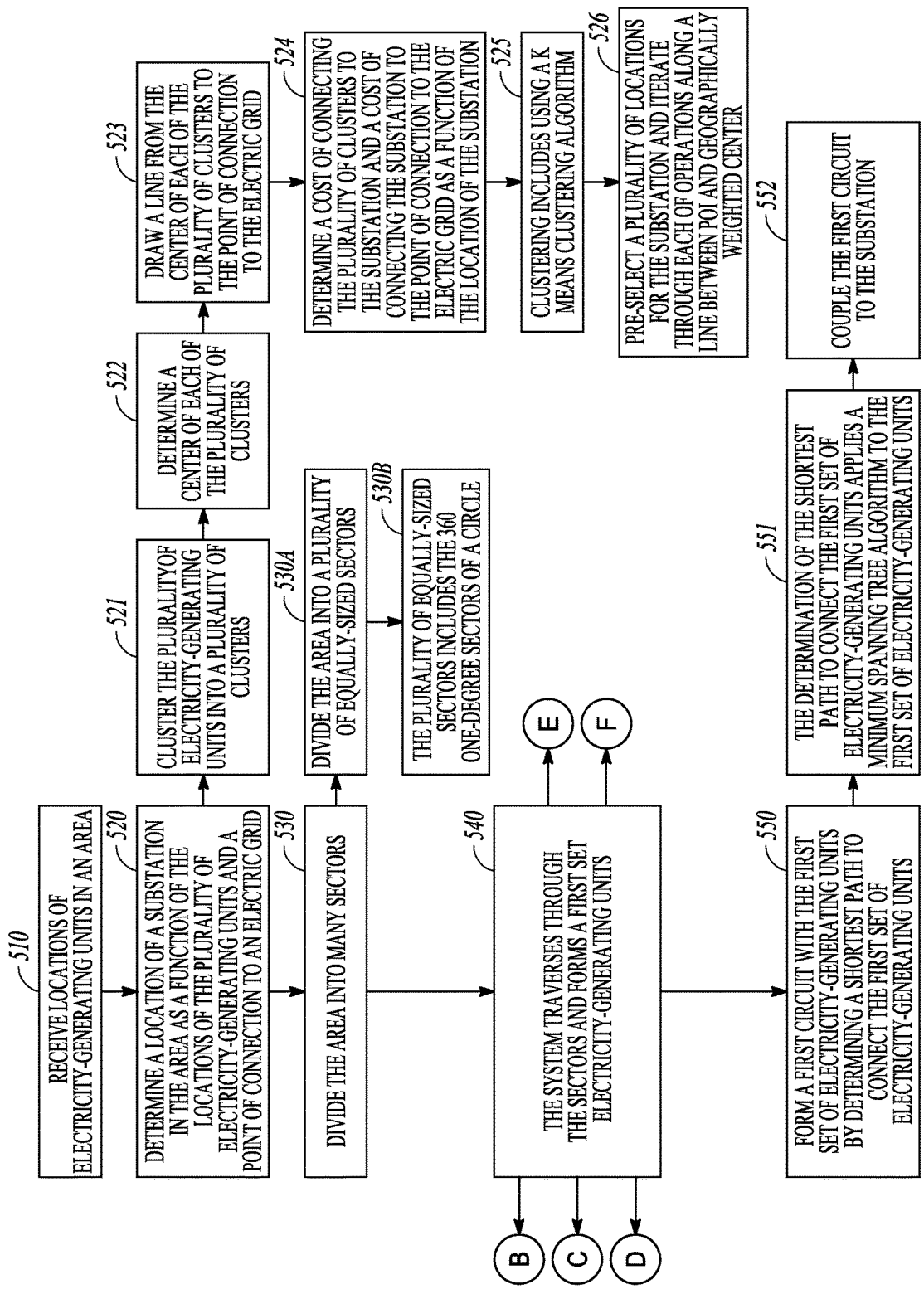
FIGS. 5A through 5F are a block diagram illustrating features and operations of an embodiment of designing and constructing an electrical circuit for electricity-generating units.
Figure 5B:
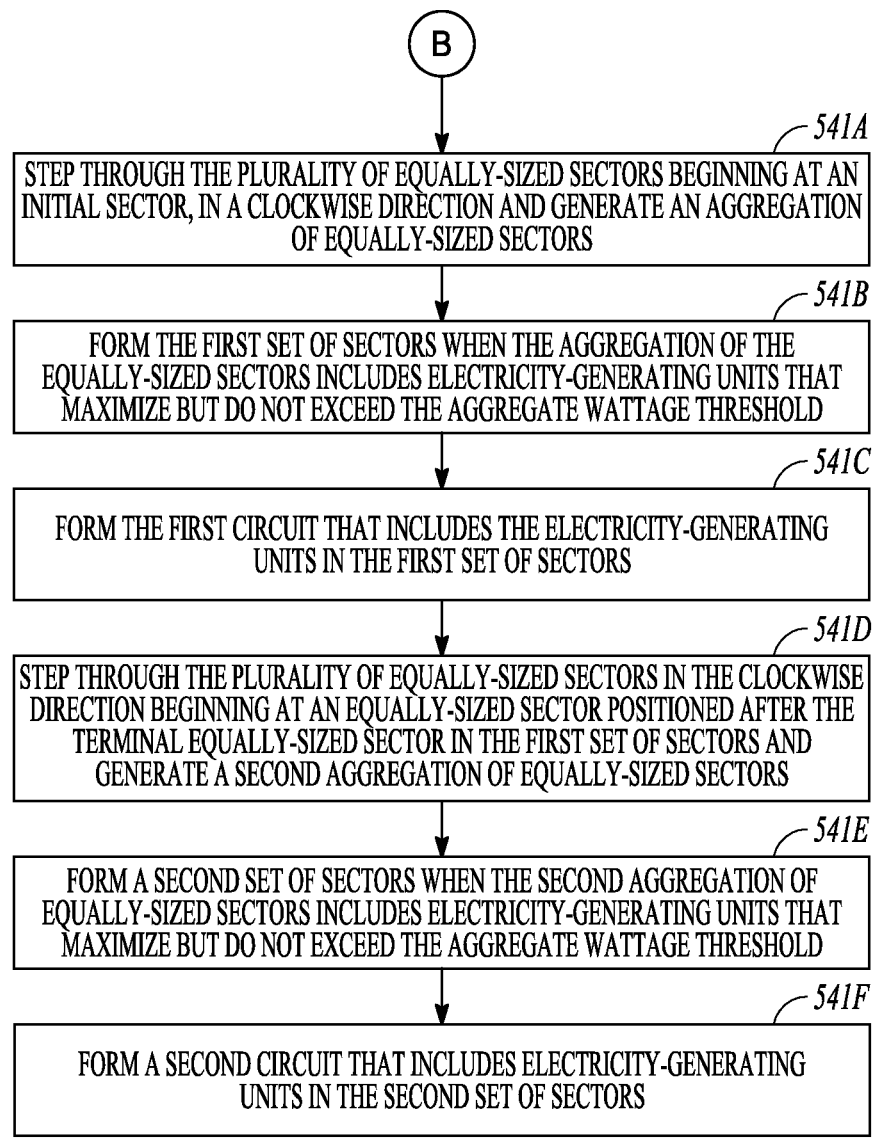
Figure 5C:
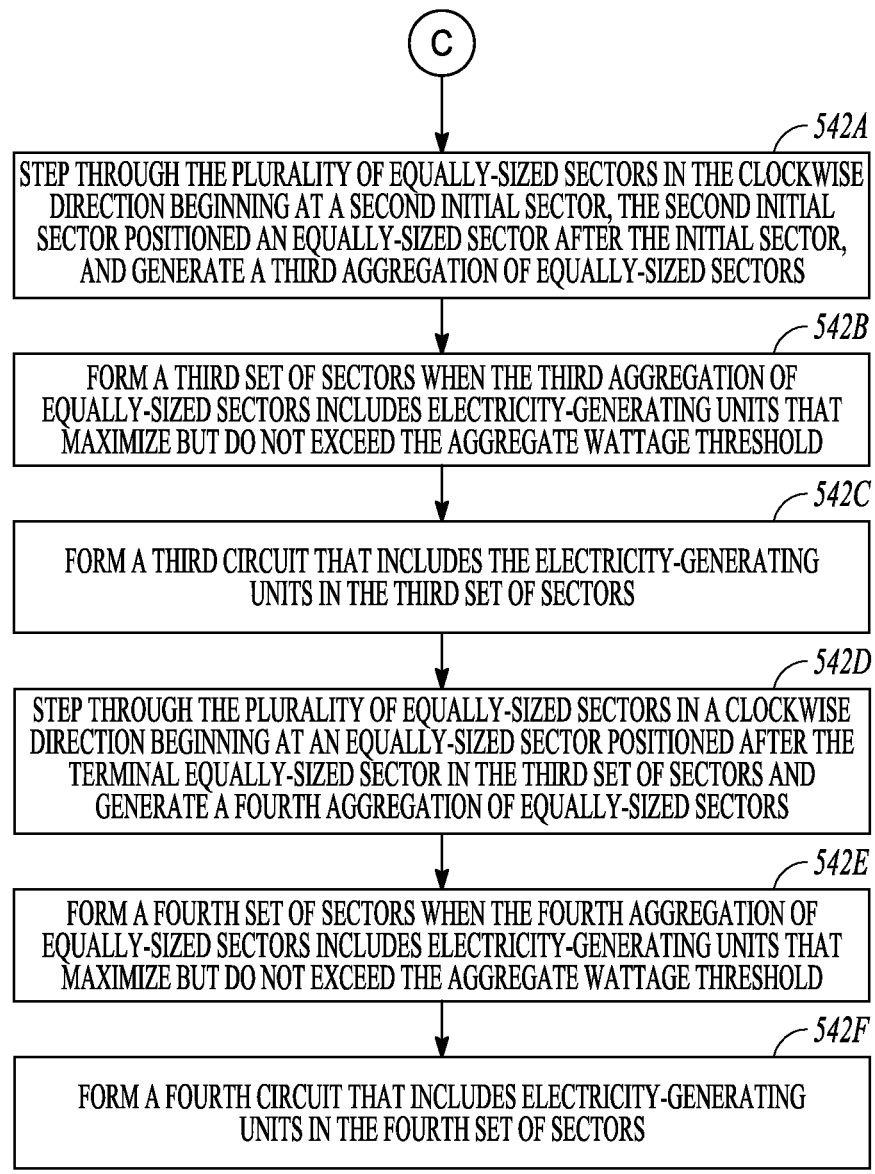
Figure 5D:
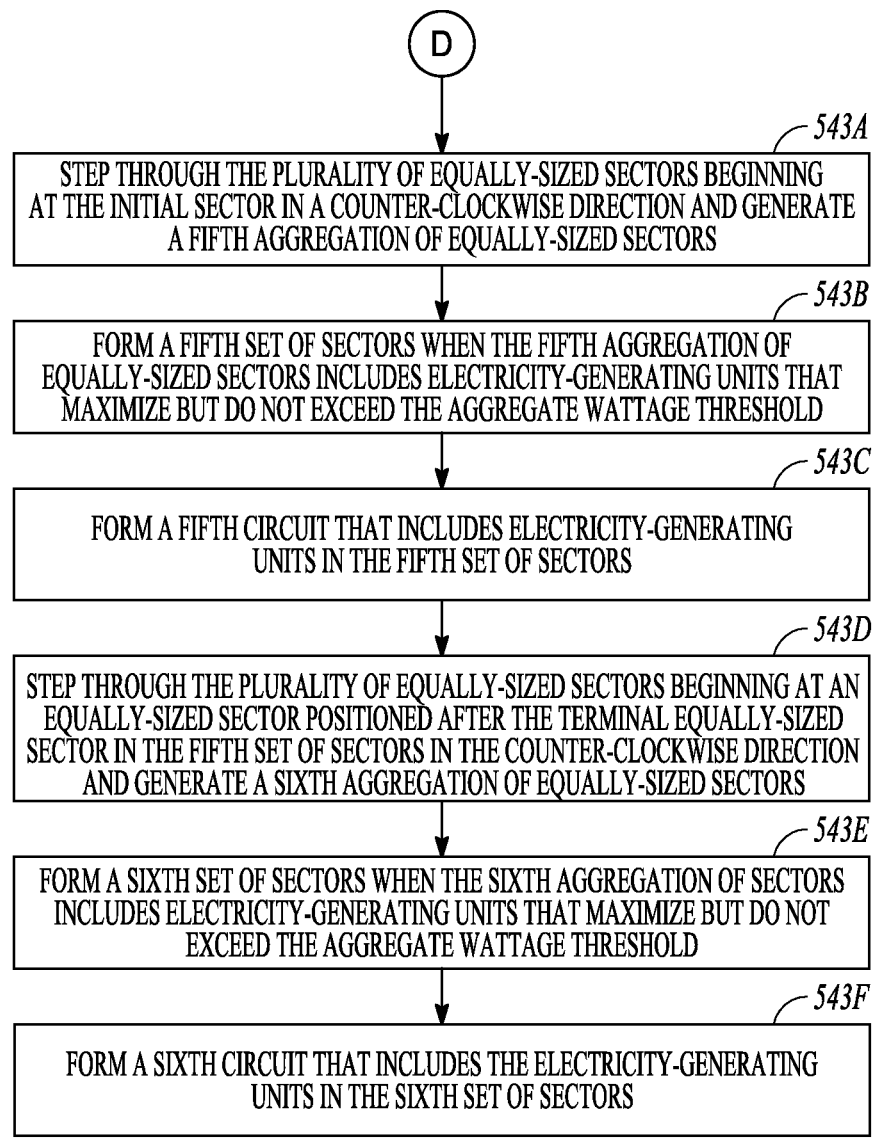
Figure 5E:
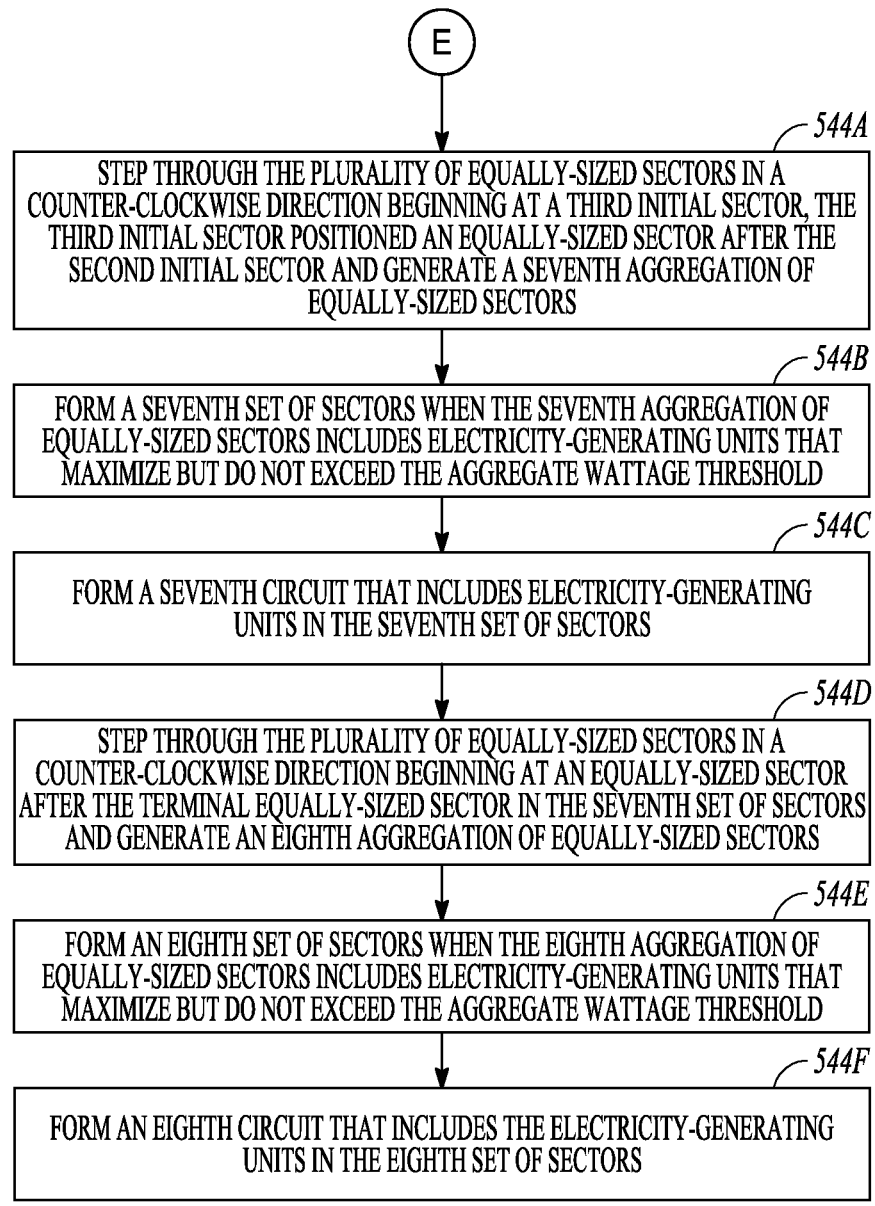
Figure 5F:
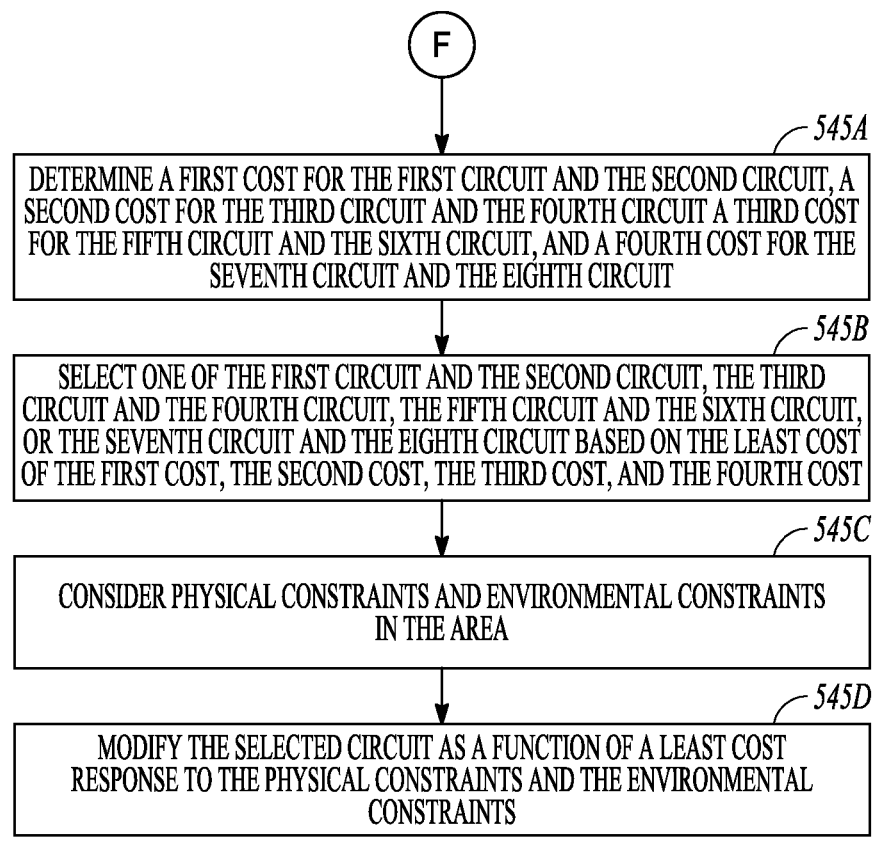

Once the process has established circuits for all turbines on the project starting from the 0° position, it begins a heuristic minimum spanning tree approach within each circuit to establish the shortest overall path to connect each turbine back to the project substation. The result of such minimum spanning tree approach is the circuit 410 illustrated in FIG. 4. It is noted that at this point, in an embodiment, the application of these minimum spanning tree algorithms does not circumvent land or environmental constraints, nor do they account for the costs associated with selecting a route by which to circumvent constraints. As noted herein, those consideration are taken into account later. After establishing a first circuit 410 as illustrated in FIG. 4, the system heuristically establishes circuits in all the other sectors that were formed starting from the 0 degree position.

That is, the process continues to do this until it has established circuits for all of the turbine clusters. It then calculates the total cost of this electrical collection system, that is, for all the circuits that were generated by the process that started at the 0 degree point. The algorithm then begins the exact same process, but starting from the 1° position 305 in FIG. 3. The algorithm performs 360 iterations of this same process by starting in all degree positions around a circle in a clockwise fashion. Thereafter, the process starts once again at the 0 degree position 310, moves in a counterclockwise direction starting at the −1 degree position 320. As can be seen from FIG. 3, the first move to the −1 degree position 315 picks up turbines 322 and 323.

Once the process has performed the 720 iterations, it selects the one group of clusters of turbines out of the 720 iterations that yielded the lowest overall system cost. With this set of turbine clusters, the process then introduces environmental and land constraints and re-runs the minimum spanning tree algorithm to select an electrical collection system design that evaluates the cost of multiple routes to circumvent constraints. For example, if the connection of two turbines requires the connection to circumvent an uncrossable wetland, the system will determine the shortest circumvention distance, and then select that shortest distance. By selecting the clusters of turbines that yielded the lowest unconstrained system cost, and then selecting the lowest cost circuit routing when constraints are introduced, the process yields significant cost savings in the electrical collection system design process.

By following this novel process, electrical collection system design is optimized for the lowest overall cost. The process also conforms to the following guidelines. First, each circuit is formed with a maximum generation capacity. Second, the process avoids the crossing of cables. Third, the process avoids tightly packed clusters that lead to large quantities of the largest cable size nearest the substation. To further expand on the third guideline, when allowed to run in an unconstrained environment, a minimum spanning tree algorithm often selects a grouping of turbines near the substation as a circuit. This in turn leads to a circuit that essentially circles the substation. The effect of this is that this circuit crosses all the other circuits. It also causes the other circuits to have long stretches of the largest cable size, since these remaining circuits are connecting to the substation from the furthest turbines, without going through the turbines closest to the substation (because these have already been selected).

FIGS. 5A through 5F are a block diagram illustrating features and operations of systems and methods that establish circuits for energy-generating units. FIGS. 5A through 5F include process blocks 510-545D. Though arranged substantially serially in the example of FIGS. 5A through 5F, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 5A through 5F, at 510, locations of electricity-generating units in an area are received into a system. The area can be referred to as a project area, such as a project to electrically couple together in several circuits the many wind turbines in a wind project. These locations can be received into a computer-based system, which stores such locations in a computer memory, and which later processes such locations using a computer processor. At 520, the system determines a location of a substation in the project area. This substation location is determined as a function of the locations of the plurality of electricity-generating units and a point of connection to an electric grid, and is explained in more detail herein in connection with operation blocks 521-524.

At 530, the system divides the area into many sectors. An illustration of such sectors in such a project area can be found in FIG. 3, and the process of dividing the project area into such sectors is further discussed below. As noted at 530A, in an embodiment, the dividing the area into a plurality of sectors includes dividing the area into a plurality of equally-sized sectors. And as further noted at 530B, the plurality of equally-sized sectors includes the 360 one-degree sectors of a circle. At 540, the system traverses through the sectors and forms a first set of clusters. This first set of clusters includes a first set of electricity-generating units. The first set of electricity-generating units has a maximum aggregate wattage that does not exceed an aggregate wattage threshold for each cluster. At 550, the system forms a first circuit with the first set of electricity-generating units by determining a shortest path to connect the first set of electricity-generating units. As indicated at 551, the determination of the shortest path to connect the first set of electricity-generating units applies a minimum spanning tree algorithm to the first set of electricity-generating units. At 552, the first circuit is coupled to the substation. The coupling of the first circuit to the substation can be accomplished as part of the minimum spanning tree process. Essentially, the minimum spanning tree algorithm includes the substation as a point with the other clustered turbines during the minimum spanning tree process.

The forming of the clusters at operation 540 in an embodiment involves 360 iterations beginning as 360 different starting points in a clockwise direction, and then 360 iterations beginning at the 360 starting points in a counterclockwise direction. Within each iteration, a cluster is formed and another cluster is started when the electricity-generating units in that cluster are maximized but do not exceed a maximum wattage threshold. After each of these 720 iterations, a minimum spanning tree algorithm is applied to each of the formed clusters in the iteration, and the clusters in the least cost iteration are selected. Thereafter, these least cost clusters can be modified to account for any environmental or other constraints in the project area.

A portion of these 720 iterations is illustrated in operations 541-544F. For example, at 541A, the system steps through the plurality of equally-sized sectors beginning at an initial sector, in a clockwise direction one equally-sized sector at a time, which generates an aggregation of equally-sized sectors. At 541B, the system forms the first set of sectors when the aggregation of the equally-sized sectors includes electricity-generating units that maximize but that do not exceed the aggregate wattage threshold. At 541C, the system forms the first circuit that includes the electricity-generating units in the first set of sectors.

At 541D, the system steps through the plurality of equally-sized sectors beginning at an equally-sized sector positioned after the terminal equally-sized sector in the first set of sectors, in the clockwise direction one equally-sized sector at a time, which generates a second aggregation of equally-sized sectors. At 541E, the system forms a second set of sectors when the second aggregation of equally-sized sectors includes electricity-generating units that maximize but that do not exceed the aggregate wattage threshold. At 541F, the system forms a second circuit that includes electricity-generating units in the second set of sectors. The system continues this process until it traverses through all 360 sectors in this first iteration, and then calculates the cost for the first circuit, the second circuit, and all the other circuits formed in this first iteration.

At 542A, the system steps through the plurality of equally-sized sectors beginning at a second initial sector. The second initial sector is positioned an equally-sized sector after the initial sector. The stepping is in a clockwise direction one equally-sized sector at a time, which generates a third aggregation of equally-sized sectors. At 542B, the system forms a third set of sectors when the third aggregation of equally-sized sectors includes electricity-generating units that maximize but that do not exceed the aggregate wattage threshold. At 542C, the system forms a third circuit that includes the electricity-generating units in the third set of sectors. At 542D, the system steps through the plurality of equally-sized sectors beginning at an equally-sized sector positioned after the terminal equally-sized sector in the third set of sectors. This stepping is executed in the clockwise direction one equally-sized sector at a time, which generates a fourth aggregation of equally-sized sectors. At 542E, the system forms a fourth set of sectors when the fourth aggregation of equally-sized sectors includes electricity-generating units that maximize but that do not exceed the aggregate wattage threshold. At 542F, the system forms a fourth circuit that includes electricity-generating units in the fourth set of sectors.

After the operations 541A-542F, the system repeats these operations for the remaining 358 sectors in the circle beginning at a different initial sector each time. The system then executes the same iteration steps for 360 iterations in the counter-clockwise direction. Specifically, as indicated at 543A, the system steps through the plurality of equally-sized sectors beginning at the initial sector in a counter-clockwise direction one equally-sized sector at a time, which generates a fifth aggregation of equally-sized sectors. At 543B, the system forms a fifth set of sectors when the fifth aggregation of equally-sized sectors includes electricity-generating units that maximize but that do not exceed the aggregate wattage threshold. At 543C, the system forms a fifth circuit that includes electricity-generating units in the fifth set of sectors. At 543D, the system steps through the plurality of equally-sized sectors beginning at an equally-sized sector positioned after the terminal equally-sized sector in the fifth set of sectors in the counter-clockwise direction one sector at a time, which generates a sixth aggregation of equally-sized sectors. At 543E, the system forms a sixth set of sectors when the sixth aggregation of sectors includes electricity-generating units that maximize but that do not exceed the aggregate wattage threshold. At 543F, the system forms a sixth circuit that includes the electricity-generating units in the sixth set of sectors.

At 544A, the system steps through the plurality of equally-sized sectors beginning at a third initial sector. The third initial sector is positioned an equally-sized sector after the initial sector (in a counterclockwise direction). This stepping is in a counter-clockwise direction one equally-sized sector at a time, which generates a seventh aggregation of equally-sized sectors. At 544B, the system forms a seventh set of sectors when the seventh aggregation of equally-sized sectors includes electricity-generating units that maximize but that do not exceed the aggregate wattage threshold. At 544C, the system forms a seventh circuit that includes electricity-generating units in the seventh set of sectors. At 544D, the system steps through the plurality of equally-sized sectors beginning at an equally-sized sector after the terminal equally-sized sector in the seventh set of sectors. This stepping once again is in the counter-clockwise direction one equally-sized sector at a time, which generates an eighth aggregation of equally-sized sectors. At 544E, the system forms an eighth set of sectors when the eighth aggregation of equally-sized sectors includes electricity-generating units that maximize but that do not exceed the aggregate wattage threshold. At 544F, the system forms an eighth circuit that includes the electricity-generating units in the eighth set of sectors.

After the operations 543A-544F, the system repeats these operations for the remaining 358 sectors in the circle in the counter-clockwise direction beginning at a different initial sector each time. After the full 360 iterations in the clockwise direction, and the full 360 iterations in the counter-clockwise direction, the system has 720 different completed sets of circuits for all the electricity-generating units, and further has the costs associated with each of these 720 different completed sets of circuits. More specifically, and continuing with the example embodiment of operations 541A-544F, at 545A, the system determines a first cost for the first circuit and the second circuit, a second cost for the third circuit and the fourth circuit, a third cost for the fifth circuit and the sixth circuit, and a fourth cost for the seventh circuit and the eighth circuit. Then, at 545B, the system selects one of the first circuit and the second circuit, the third circuit and the fourth circuit, the fifth circuit and the sixth circuit, or the seventh circuit and the eighth circuit. This selection is based on the first cost, the second cost, the third cost, and the fourth cost, and more specifically, the lowest cost among the first cost, the second cost, the third cost, and the fourth cost.

After selecting the lowest cost circuit, the system at 545C considers physical constraints and environmental constraints in the area. Specifically, at 545D, the system modifies the selected circuit as a function of a least cost response to the physical constraints and the environmental constraints. For example, when confronted with an environmental obstacle such as a wetland that cannot be crossed, the system determines the shortest path around such an obstacle. As previously noted, the physical constraints and the environmental constraints can include, for example, a boundary area, a road infrastructure, a structure, a wetland, or a topographical feature, among others.

As noted above, at 520, the system determines a location of a substation in the project area. This substation location is determined as a function of the locations of the plurality of electricity-generating units and a point of connection to an electric grid. More specifically, at 521, the system clusters the plurality of electricity-generating units into a plurality of clusters. Then, at 522, the system first determines a center of each of the plurality of clusters, and then at 523 establishes lines from the center of each of the plurality of clusters to the point of connection to the electric grid. At 524, the system determines a cost of connecting the plurality of clusters to the substation and a cost of connecting the substation to the point of connection to the electric grid as a function of the location of the substation. As noted at 525, the clustering includes using a k means clustering algorithm. As further indicated at 526, the system pre-selects a plurality of locations for the substation along a path between the POI and the geographically weighted center of all turbines, and iterates through each of operations 521-524 for each of the plurality of locations for the substation to determine a location of the substation that generates a least cost of connecting the plurality of clusters to the substation and connecting the substation to the point of connection to the electric grid. The system then selects the substation location that has the least cost. In another embodiment, as discussed above, the system selects a substation location that is centrally located in the project area, a substation that is located near a project boundary, or some other location for the substation.

Another embodiment addresses the problems associated with the use of simple, basic minimum spanning tree algorithms. When using the minimum spanning tree algorithm to cluster the turbines, the turbines that surround and/or are in close proximity to the substation are removed from consideration by the minimum spanning tree algorithm. This prevents the minimum spanning tree algorithm from forming a cluster of only the turbines that surround the substation, which would then lead to crossovers of the underground collection from the other turbine clusters. After the clusters are formed by the minimum spanning tree algorithm (without the turbines that surround and/or are in close proximity to the substation), the clusters are then coupled to the substation, either directly from the cluster itself or through one or more of the turbines that surround and/or are in close proximity to the substation.

Figure 6:
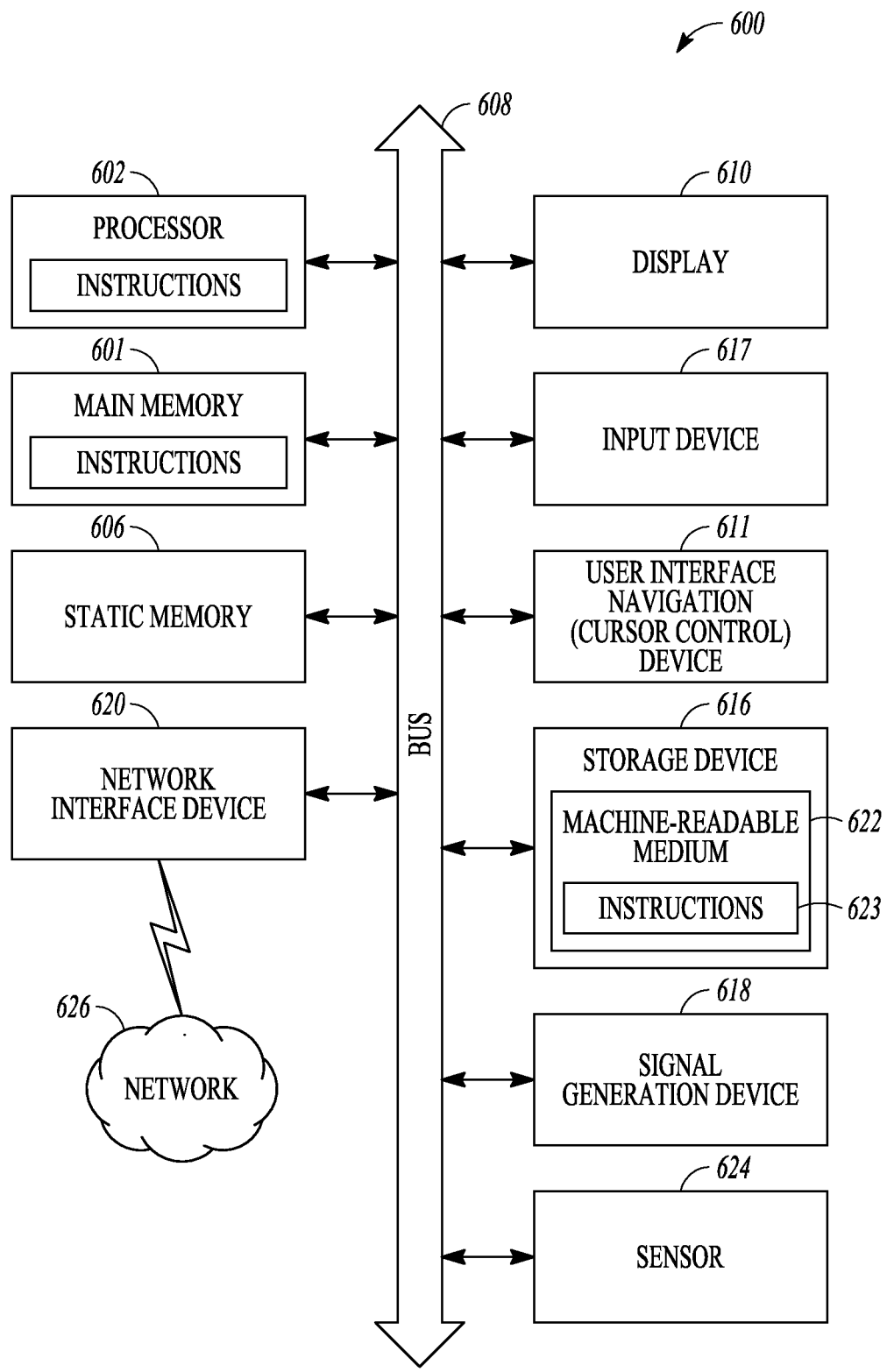
FIG. 6 is a diagrammatic representation of a computer system upon which one or more of the embodiments disclosed herein can execute.

FIG. 6 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 601 and a static memory 606, which communicate with each other via a bus 608. The computer system 600 may further include a display unit 610, an alphanumeric input device 617 (e.g., a keyboard), and a user interface (UI) navigation device 611 (e.g., a mouse). In one embodiment, the display, input device and cursor control device are a touch screen display. The computer system 600 may additionally include a storage device 616 (e.g., drive unit), a signal generation device 618 (e.g., a speaker), a network interface device 620, and one or more sensors 621, such as a global positioning system sensor, compass, accelerometer, or other sensor.

The drive unit 616 includes a machine-readable medium 622 on which is stored one or more sets of instructions and data structures (e.g., software 623) embodying or utilized by any one or more of the methodologies or functions described herein. The software 623 may also reside, completely or at least partially, within the main memory 601 and/or within the processor 602 during execution thereof by the computer system 600, the main memory 601 and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 623 may further be transmitted or received over a communications network 626 using a transmission medium via the network interface device 620 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The invention claimed is:

1. A process comprising:
receiving, into a computer processor, locations of a plurality of electricity-generating units in an area;
determining a location of a substation as a function of the locations of the plurality of electricity-generating units and a point of connection to an electric grid;
dividing the area into a plurality of sectors;
traversing through the sectors and forming a first set of sectors, the first set of sectors comprising a first set of electricity-generating units, the first set of electricity-generating units not exceeding an aggregate wattage threshold; and
forming a first circuit with the first set of electricity-generating units by determining a shortest path to connect the first set of electricity-generating units.

2. The process of claim 1, wherein the dividing the area into a plurality of sectors comprises dividing the area into a plurality of equally-sized sectors.

3. The process of claim 2, wherein the traversing through the sectors comprises:
stepping through the plurality of equally-sized sectors, beginning at an initial sector, in a clockwise direction one equally-sized sector at a time, thereby generating an aggregation of equally-sized sectors;
forming the first set of sectors when the aggregation of equally-sized sectors comprises electricity-generating units not exceeding the aggregate wattage threshold;
forming the first circuit comprising electricity-generating units in the first set of sectors;
stepping through the plurality of equally-sized sectors, beginning at an equally-sized sector positioned after a terminal equally-sized sector in the first set of sectors, in the clockwise direction one equally-sized sector at a time, thereby generating a second aggregation of equally-sized sectors;

forming a second set of sectors when the second aggregation of equally-sized sectors comprises electricity-generating units not exceeding the aggregate wattage threshold; and forming a second circuit comprising electricity-generating units in the second set of sectors.

4. The process of claim 3, wherein the traversing through the sectors comprises:

stepping through the plurality of equally-sized sectors, beginning at a second initial sector, the second initial sector positioned an equally-sized sector after the initial sector, in a clockwise direction one equally-sized sector at a time, thereby generating a third aggregation of equally-sized sectors;

forming a third set of sectors when the third aggregation of equally-sized sectors comprises electricity-generating units not exceeding the aggregate wattage threshold;

forming a third circuit comprising electricity-generating units in the third set of sectors;

stepping through the plurality of equally-sized sectors, beginning at an equally-sized sector positioned after a terminal equally-sized sector in the third set of sectors, in the clockwise direction one equally-sized sector at a time, thereby generating a fourth aggregation of equally-sized sectors;

forming a fourth set of sectors when the fourth aggregation of equally-sized sectors comprises electricity-generating units not exceeding the aggregate wattage threshold; and forming a fourth circuit comprising electricity-generating units in the fourth set of sectors.

5. The process of claim 4, wherein the traversing through the sectors comprises:

stepping through the plurality of equally-sized sectors, beginning at the initial sector, in a counter-clockwise direction one equally-sized sector at a time, thereby generating a fifth aggregation of equally-sized sectors;

forming a fifth set of sectors when the fifth aggregation of equally-sized sectors comprises electricity-generating units not exceeding the aggregate wattage threshold;

forming a fifth circuit comprising electricity-generating units in the fifth set of sectors;

stepping through the plurality of equally-sized sectors, beginning at an equally-sized sector positioned after a terminal equally-sized sector in the fifth set of sectors, in the counter-clockwise direction one sector at a time, thereby generating a sixth aggregation of equally-sized sectors;

forming a sixth set of sectors when the sixth aggregation of sectors comprises electricity-generating units not exceeding the aggregate wattage threshold; and forming a sixth circuit comprising electricity-generating units in the sixth set of sectors.

6. The process of claim 5, wherein the traversing through the sectors comprises:

stepping through the plurality of equally-sized sectors, beginning at a third initial sector, the third initial sector positioned an equally-sized sector after the initial sector, in a counter-clockwise direction one equally-sized sector at a time, thereby generating a seventh aggregation of equally-sized sectors;

forming a seventh set of sectors when the seventh aggregation of equally-sized sectors comprises electricity-generating units not exceeding the aggregate wattage threshold;

forming a seventh circuit comprising electricity-generating units in the seventh set of sectors;

stepping through the plurality of equally-sized sectors, beginning at an equally-sized sector after a terminal equally-sized sector in the seventh set of sectors, in the counter-clockwise direction one equally-sized sector at a time, thereby generating an eighth aggregation of equally-sized sectors;

forming an eighth set of sectors when the eighth aggregation of equally-sized sectors comprises electricity-generating units not exceeding the aggregate wattage threshold; and forming an eighth circuit comprising electricity-generating units in the eighth set of sectors.

7. The process of claim 6, comprising:

determining a first cost for the first circuit and the second circuit;

determining a second cost for the third circuit and the fourth circuit;

determining a third cost for the fifth circuit and the sixth circuit;

determining a fourth cost for the seventh circuit and the eighth circuit;

selecting one of the first circuit and the second circuit, the third circuit and the fourth circuit, the fifth circuit and the sixth circuit, or the seventh circuit and the eighth circuit as selected circuits as a function of the first cost, the second cost, the third cost, and the fourth cost; and coupling the selected circuits to the substation by incorporating the substation into a cluster of the electricity generating units and utilizing a minimum spanning tree algorithm.

8. The process of claim 7, comprising:

receiving into the computer processor data relating to physical constraints and environmental constraints in the area; and modifying the selected circuits as a function of a least cost response to the physical constraints and the environmental constraints;

wherein the data relating to the physical constraints and the environmental constraints comprise one or more of a boundary area, a road infrastructure, a structure, a wetland, and a topographical feature.

9. The process of claim 2, wherein the plurality of equally-sized sectors comprises 360 one-degree sectors.

10. The process of claim 1, wherein the determining the location of the substation as a function of the locations of the plurality of electricity-generating units and the point of connection to the electric grid comprises:

(a) clustering the plurality of electricity-generating units into a plurality of clusters;

(b) determining a center of each of the plurality of clusters;

(c) determining distances from the center of each of the plurality of clusters to the point of connection to the electric grid; and (d) determining a cost of connecting the plurality of clusters to the substation and a cost of connecting the substation to the point of connection to the electric grid as a function of the distances and the location of the substation.

11. The process of claim 10, wherein the clustering comprises using a k means clustering algorithm.

12. The process of claim 10, comprising pre-selecting a plurality of locations for the substation along a path between the point of connection and the geographically weighted center of the turbines, and iterating through each of steps (a) through (d) for each of the plurality of locations for the substation to determine a location of the substation that generates a least cost of connecting the plurality of clusters to the substation and connecting the substation to the point of connection to the electric grid; and selecting a substation location with the least cost.

13. The process of claim 1, wherein the determining the shortest path to connect the first set of electricity-generating units comprises applying a minimum spanning tree algorithm to the first set of electricity-generating units.

14. The process of claim 1, comprising coupling the first circuit to the substation by incorporating the substation into the cluster of turbines and utilizing a minimum spanning tree algorithm.

15. The process of claim 14, wherein the substation is centrally located in the area.

16. The process of claim 1, wherein the plurality of electricity-generating units comprises wind turbines.

17. The process of claim 1, comprising connecting the electricity-generating units in the first circuit according to the shortest path; and connecting the first circuit to the substation.

18. A process for determining a location of a substation in an area of a plurality of electricity-generating units as a function of locations of the plurality of electricity-generating units and a location of a point of connection to an electric grid comprising:
(a) selecting a proposed location of the substation;
(b) determining a distance from the proposed location of the substation to the location of the point of connection to the electric grid;
(c) clustering the plurality of electricity-generating units into a plurality of clusters;
(d) determining a center of each of the plurality of clusters;
(e) determining distances from the center of each of the plurality of clusters to the location of the point of connection to the electric grid; and
(f) determining a cost of connecting the plurality of clusters to the substation and a cost of connecting the proposed location of the substation to the location of the point of connection to the electric grid as a function of the distances from the center of each of the plurality of clusters to the location of the point of connection to the electric grid and the distance from the proposed location of the substation to the location of the point of connection to the electric grid.

19. The process of claim 18, comprising pre-selecting a plurality of proposed locations for the substation along a path between the point of interconnect and the geographically weighted center of the turbines, and iterating through each of steps (a) through (f) for each of the plurality of proposed locations for the substation to determine the proposed location of the substation that generates a least cost of connecting the plurality of clusters to the substation and connecting the substation to the point of connection to the electric grid; and selecting the proposed location of the substation with the least cost.

20. A process comprising:
receiving, into a computer processor, locations of a plurality of electricity-generating units in an area;
dividing the area into a plurality of sectors;
traversing through the plurality of sectors in a first direction, beginning at an initial sector, one sector at a time, and forming a first set of multiple aggregate sectors, each multiple aggregate sector comprising a group of electricity generating units that does not exceed a wattage threshold;
traversing through the plurality of sectors in the first direction, beginning at a second initial sector, one sector at a time, and forming a second set of multiple aggregate sectors, each multiple aggregate sector in the second set comprising a group of electricity generating units that does not exceed the wattage threshold;
traversing through the plurality of sectors in a second direction, beginning at the initial sector, one sector at a time, and forming a third set of multiple aggregate sectors, each multiple aggregate sector in the third set comprising a group of electricity generating units that does not exceed the wattage threshold;
traversing through the plurality of sectors in the second direction, beginning at a third initial sector, one sector at a time, and forming a fourth set of multiple aggregate sectors, each multiple aggregate sector in the fourth set comprising a group of electricity generating units that does not exceed a wattage threshold;
determining a cost for connecting the electricity-generating units in each of the first set of multiple aggregate sectors, the second set of multiple aggregate sectors, the third set of multiple aggregate sectors, and the fourth set of multiple aggregate sectors; and
selecting as a circuit one of the first set of multiple aggregate sectors, the second set of multiple aggregate sectors, the third set of multiple aggregate sectors, or the fourth set of multiple aggregate sectors as a function of the cost.

21. The process of claim 20, comprising:
receiving into the computer processor data relating to physical constraints and environmental constraints in the area; and
modifying the selected circuit as a function of a least cost response to the physical constraints and the environmental constraints.

22. The process of claim 20, comprising determining a location of a substation as a function of the locations of the plurality of electricity-generating units and a point of connection to an electric grid.

23. A process comprising:
receiving, into a computer processor, locations of a plurality of electricity-generating units in an area;
dividing the area into a plurality of sectors;
traversing through the plurality of sectors, beginning at an initial sector, one sector at a time, and forming a first set of multiple aggregate sectors, each multiple aggregate sector comprising a group of electricity generating units that does not exceed a wattage threshold;
traversing through the plurality of sectors, beginning at a second initial sector, one sector at a time, and forming a second set of multiple aggregate sectors, each multiple aggregate sector in the second set comprising a group of electricity generating units that does not exceed the wattage threshold;
determining a cost for connecting the electricity-generating units in each of the first set of multiple aggregate sectors and the second set of multiple aggregate sectors; and
selecting as a circuit one of the first set of multiple aggregate sectors or the second set of multiple aggregate sectors.

24. A process comprising:
receiving, into a computer processor, locations of a plurality of electricity-generating units in an area;
determining a location of a substation as a function of the locations of the plurality of electricity-generating units and a point of connection to an electric grid;
identifying a first set of electricity generating units that surround or are in close proximity to the substation;
clustering the electricity generating units into clusters, wherein the clusters do not include the first set of electricity generating units; and
coupling the clusters directly to the substation or coupling the clusters to the substation through one or more electricity generating units in the first set of electricity generating units.

25. The process of claim 24, wherein the clustering the electricity generating units comprises using a minimum spanning tree algorithm.

\* \* \* \* \*